No. 854,268. PATENTED MAY 21, 1907.
L. BURRELL.
MILKING MACHINE.
APPLICATION FILED JAN. 12, 1906.
2 SHEETS—SHEET 1.
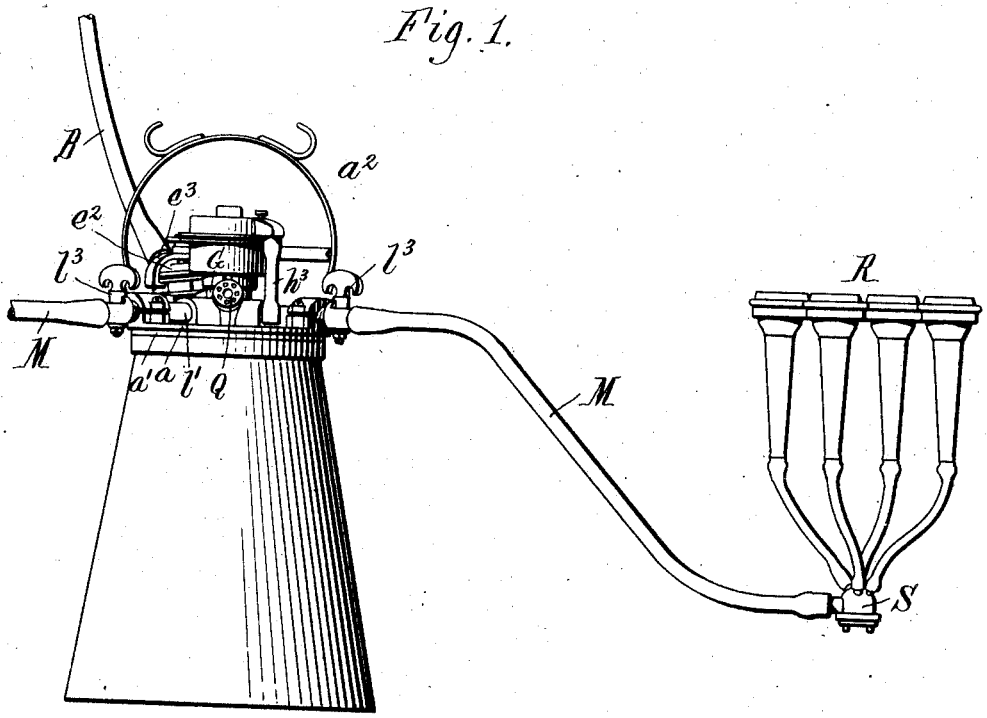

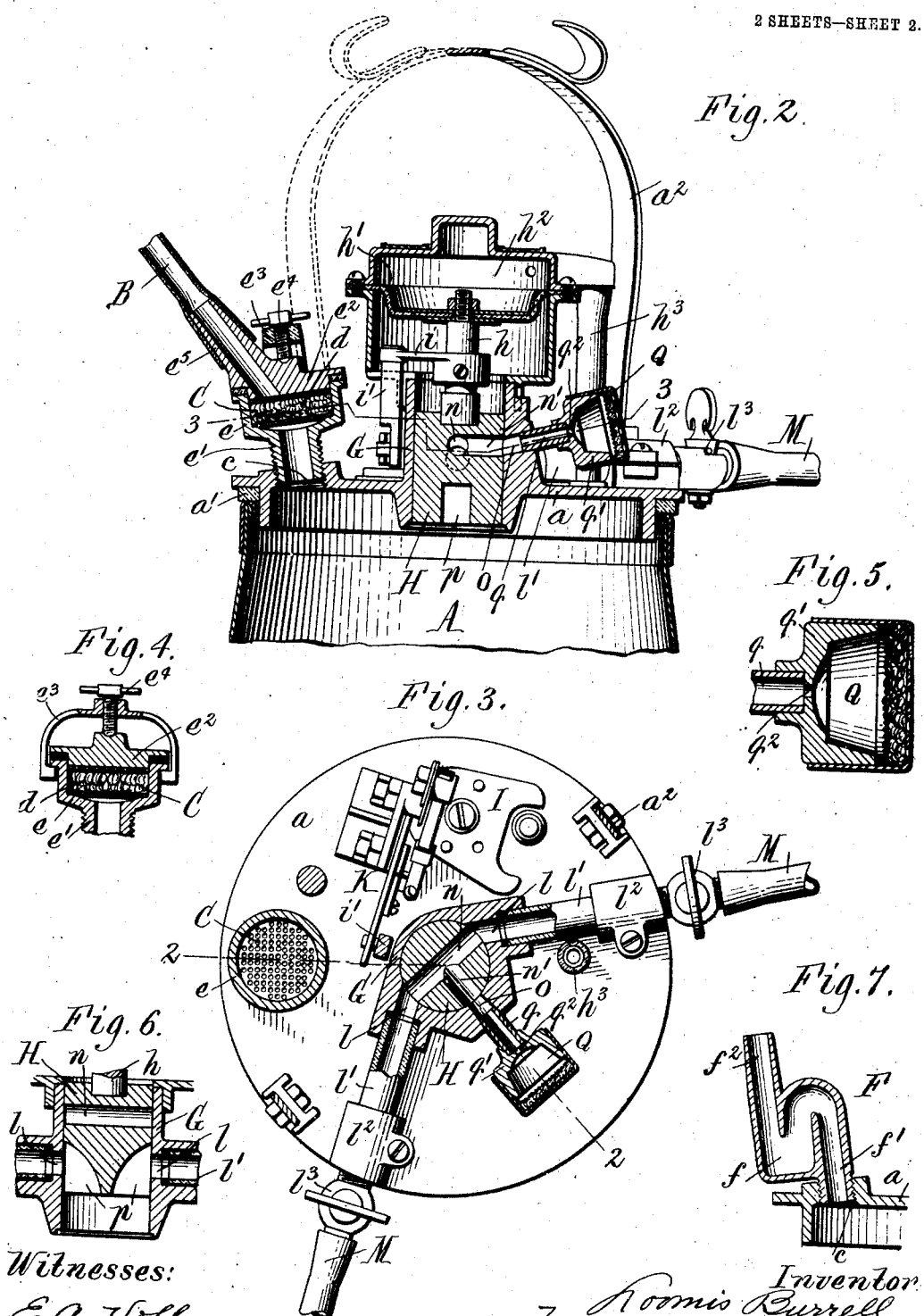

UNITED STATES PATENT OFFICE.

LOOMIS BURRELL, OF LITTLE FALLS, NEW YORK, ASSIGNOR TO D. H. BURRELL & COMPANY, OF LITTLE FALLS, NEW YORK.

MILKING-MACHINE.

No. 854,268.  Specification of Letters Patent.  Patented May 21, 1907.

Application filed January 12, 1906. Serial No. 295,716.

*To all whom it may concern:*

Be it known that I, LOOMIS BURRELL, a citizen of the United States, residing at Little Falls, in the county of Herkimer and State of New York, have invented a new and useful Improvement in Milking-Machines, of which the following is a specification.

This invention relates mainly to that class of milking machines which operate by suction upon the teats.

In order to produce milk which contains a minimum quantity of bacteria and other ingredients and substances which cause or promote decomposition or other injurious changes in the milk, it is necessary to prevent, as far as possible, access to the milk of such bacteria and substances from the surrounding air.

My invention has for its objects to simplify the mechanism and to provide the same with means for preventing objectionable substances from entering the receiving vessel or pail and contaminating the milk therein.

In the accompanying drawings, consisting of two sheets: Figure 1 is an elevation of a milking machine embodying my improvements, the figure showing one of the sets of teat cups connected with the pulsator. Fig. 2 is a vertical section of the pulsator and connecting parts in line 2—2, Fig. 3. Fig. 3 is a horizontal section in line 3—3, Fig. 2. Fig. 4 is a detached vertical section of the filter in the main suction conduit at right angles to Fig. 2. Fig. 5 is an enlarged sectional view of the filter connected with the air inlet of the pulsator. Fig. 6 is a vertical section through the pulsator at right angles to Fig. 2, showing the pulsator valve in its upper position. Fig. 7 is a vertical section, showing a trapped chamber in the main suction conduit instead of a filter.

Like letters of reference refer to like parts in the several figures.

A represents the body of the milk pail or receptacle which is closed by the cover $a$ upon which the pulsator is mounted, a packing ring $a'$ being interposed, as usual, between the cover and the top rim of the pail. The cover is provided with the usual bail or curved handle $a^2$.

B represents the main suction pipe which leads to the exhaust tank or other apparatus by which suction is applied to the pail.

C represents a separating or intercepting chamber which is arranged in the suction conduit of which the pipe B forms part and which is arranged between said pipe and the suction opening $c$ in the cover $a$ of the milk pail. As shown in Figs. 1—4, this intercepting chamber is filled with a filter, consisting of a packing $d$ of cotton, or other filtering material suitable for intercepting particles of liquid, dust or other matter which are carried on the air which passes through the suction conduit, either from the milk pail to the suction conduit or from the latter to the pail. This intercepting or separating chamber comprises a casing $e$ which is provided at its bottom with a nipple $e'$ by which it is secured in the suction opening $c$ of the cover $a$, and a cover $e^2$ which is secured to the casing by any suitable means, for instance, a bail $e^3$ and screw $e^4$, and which is provided with a nipple $e^5$ to which the suction pipe B is attached.

In the operation of the machine the air is drawn by the exhaust from the pail into the main suction pipe and this air carries with it vapor and fine particles of milk which, in the absence of a filter or other intercepting means, are precipitated upon the interior surface of main suction pipe. When the precipitated moisture reaches the form of drops it flows back to the milk vessels, and as the main suction pipe is often unclean the liquid which so returns from the pipe to the pail carries with it objectionable matter by which the milk is contaminated. The filter intercepts such liquid particles and prevents the bulk of the same from reaching the suction pipe. It also prevents any liquid or other impurities which may collect in the main suction pipe from passing to the pail, particularly during the inrush of air which takes place upon disconnecting the suction pipe from the pail when the operation of milking has been finished. The matter which is caught by the filter is readily removed by removing the filtering material and cleaning the filter casing.

Instead of providing the separating or intercepting chamber with a filter, the chamber may be provided with a bent or trapped passage F, Fig. 7, in which the liquid or dust particles are separated and precipitated by a reversal of the air current. The trapped chamber is preferably provided with a catch basin $f$ of sufficient capacity to hold the quantity of liquid which is liable to be deposited, and leave above the liquid level a free passage for the air. The trapped intercepting chamber is provided at one side with a nipple $f'$ for connection with the suction opening $c$ of the cover and at the other side with a nipple $f^2$ for connection with the suction pipe B.

G represents the upright cylinder of the pulsator formed centrally on the cover $a$ of the milk vessel, and H represents the piston valve arranged to move up and down in this cylinder. $h$ represents the rod which connects this valve with the flexible diaphragm $h'$ forming the bottom of the exhaust chamber $h^2$. The latter is connected with the cover $a$ by a pipe $h^3$ which is alternately placed in communication with the exhausted interior of the pail or the external air by a reversing valve I which is operated from the piston valve by an arm $i$, depending rod $i'$ and spring mechanism K. The latter may be similar to that which is described and shown in my Letters Patent No. 784,780, March 14, 1905.

The upright valve cylinder G is provided above the cover $a$, on opposite sides, with milk inlet ports or nipples $l$, each of which is connected in any suitable way with the main milk pipe M, for instance, by a glass tube $l'$, fixed tube $l^2$ and cock $l^3$.

The piston or pulsator valve H is provided in its upper portion with a transverse air port $n$, suitable for connecting with both milk ports $l$ of the valve cylinder, and with a radial air port $n'$ which extends from the transverse port $n$ to the side of the valve. In the lower position of the piston valve, represented in Fig. 2, the port $n'$ connects with an air inlet port O formed in the side of the valve cylinder G above the cover $a$. The valve extends below the milk ports $l$ in its upper position, represented in Fig. 6, and is provided in its lower portion with lateral recesses $p$ suitable for placing the milk ports $l$ in communication with the exhausted interior of the milk vessel in this position of the valve. When the valve is in its upper position the air ports $n$ $n'$ of the valve are out of register with the air inlet port O of the valve cylinder, the port O is closed by the valve, and the recesses $p$ of the valve are in register with the milk ports $l$ of the cylinder, so that the suction which is applied to the milk vessel acts through the ports $l$ upon the milk pipes M and the milk passes through said pipes, ports $l$ and the recesses of the valve H into the milk vessel. When the pulsator valve is in its lower position, Fig. 2, the milk ports $l$ are closed by the valve, the suction is cut off from these ports and from the milk pipes M, the air ports $n$ $n'$ of the valve are in register with the air inlet port O and the milk ports $l$ of the valve cylinder and the external air is admitted to the milk pipes M, whereby the vacuum in the same is relieved.

The air inlet opening in the valve cylinder is of such a restricted area with reference to the capacity of the milk passages and teat cups that the volume of air which is admitted to these parts while the valve remains in its lower position is sufficient to reduce the partial vacuum nearly but not quite to the atmospheric pressure, leaving a sufficient amount of exhaustion in the milk passages and teat cups to prevent the latter from dropping from the teats. Ordinarily it is advisable to so proportion the parts that the partial vacuum drops to about two inches of mercury with the pulsator making about sixty pulsations per minute. An air inlet of about one-eighth of an inch in diameter is suitable for milk pipes and cups of ordinary size. This restricted air inlet is not controlled by a valve but is always open directly into the outer air and admits the air directly to the milk passages during the whole relieving period during which the pulsator valve establishes communication between the air inlet and the milk passages.

In order to prevent objectionable matters from entering the milk spaces with the air, the air inlet opening O is guarded by a filter Q through which the air is compelled to pass. This filter is applied by its nipple $q$ to the air inlet opening O of the valve cylinder and the filter casing $q'$ is provided with the restricted inlet opening $q^2$ which controls the relieving volume of air which is admitted to the milk pipes and teat cups during each pulsation. The filtering material may be cotton or some other suitable porous material.

R represents the teat cups which may be of any suitable construction and which are connected with the milk pipe M by a connector or manifold coupling S.

I claim as my invention:

1. In a milking machine, the combination of a milk receiving vessel, teat cups connected therewith, a suction conduit which is connected with said vessel and to which suction is applied continuously, and a filter arranged in said conduit and operating to intercept liquid particles which are carried on the air drawn from the vessel into the suction conduit, the suction resisting the return of the intercepted particles to the receiving vessel, substantially as set forth.

2. In a milking machine, the combination of a pulsator valve having an air port, and a valve cylinder having an air inlet port and a milk port, the air port in the valve being arranged to place the air inlet port of the cylinder in communication with said milk port, and the air inlet port of the cylinder having a restricted inlet which communicates directly and without the intervention of a valve with the milk port of the cylinder through the air port of the pulsator valve, substantially as set forth.

3. The combination of a milk vessel provided with a valve cylinder having a milk port and having in its side a restricted air inlet which communicates directly and without the intervention of a valve with the outer air, and a pulsator valve which is provided with an air port arranged to place the air inlet of the cylinder in communication with said milk port, substantially as set forth.

4. In a milking machine, the combination of a milk receiving vessel having a removable cover, a pulsator valve and cylinder arranged upon said cover, a milk pipe connected with said valve cylinder, teat cups connected with said milk pipe, and a restricted air inlet formed on said valve cylinder, substantially as set forth.

5. In a milking machine, the combination of a pulsator valve, an inlet for admitting the external air to the milk passage, and a filter which covers said inlet and through which the air is compelled to pass, substantially as set forth.

6. In a milking machine, the combination of a pulsator valve, a cylinder in which the same is arranged and which is provided with an air inlet for admitting the external air through said valve to the milk passage, and a filter which covers said inlet, substantially as set forth.

7. In a milking machine, the combination of a milk receiving vessel having a removable cover, a pulsator valve and cylinder arranged upon said cover, said cylinder being provided with an inlet for admitting the external air, and a filter which is secured to said inlet, substantially as set forth.

Witness my hand, this third day of January, 1906.

LOOMIS BURRELL.

Witnesses:
CHAS. B. DALZELL,
F. A. LAUR.